United States Patent [19]
Brownell, Jr.

[11] 4,283,592
[45] Aug. 11, 1981

[54] FILLED ELECTRICAL SPLICE CASE

[75] Inventor: Kenneth W. Brownell, Jr., Asheville, N.C.

[73] Assignee: Akzona Incorporated, Asheville, N.C.

[21] Appl. No.: 69,023

[22] Filed: Aug. 23, 1979

[51] Int. Cl.³ ............................................... H02G 9/00
[52] U.S. Cl. ............................. 174/21 R; 174/17 LF; 174/18; 174/37; 174/91
[58] Field of Search ...................... 174/17 R, 21 R, 18, 174/37, 38, 91, 17 LF

[56] References Cited

U.S. PATENT DOCUMENTS

| 461,239 | 10/1891 | Foster | 174/38 |
|---|---|---|---|
| 3,522,404 | 8/1970 | Trayer | 174/18 X |
| 3,878,314 | 4/1975 | Link | 174/37 |

Primary Examiner—Roy N. Envall, Jr.
Attorney, Agent, or Firm—Francis W. Young; David M. Carter

[57] ABSTRACT

A splice case housing electrical splices between two cables where the splices are immersed in an oil sealant having a specific gravity greater than water. The case includes holes located above the splices for receiving the electrical cables. Since the oil is heavier than water, if water were to enter the splice case, it would be above the oil and splices, thereby causing a hydraulic force on the oil, causing an even more intimate seal of the oil around the splices.

10 Claims, 1 Drawing Figure

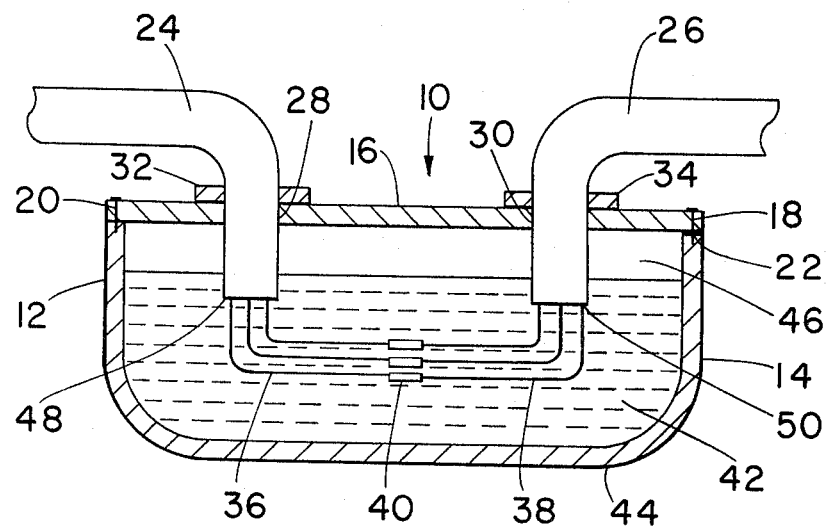
THE FIG.

FILLED ELECTRICAL SPLICE CASE

BACKGROUND TO THE INVENTION

This invention relates to a means for preventing moisture from coming in contact with electrical components in a container. More particularly, it relates to an improved telephone cable splice case, which is readily re-enterable.

In the telephone communication industry, signals are transmitted many miles over cable containing many pairs of conductors. Since this cable is sold in fixed lengths, usually several hundred feet each, it is necessary to splice cables together. The ends of corresponding conductors of abutting cables are tied or spliced together after their insulations have been trimmed, exposing their metallic conductors. In order to protect these exposed metallic conductor splices from the elements, such as moisture, the splices are housed in a splice case. If the cable is an air core type, which is normally used above ground on telephone poles, the splice case is usually under air pressure, and thus air acts as a filler in the splice case to keep out moisture. However, recently it has become a common practice to bury telephone cable underground. Moisture is a major problem in buried cable. To solve this problem, the industry uses a heavy grease filling in the core of buried cable. The splice case commonly used for buried cable is normally a jel compound which sets up after it has been injected into the splice case to form a hard rubber filler in an attempt to seal the case. One of the problems in using this type of rubber-filled splice case is that it is very difficult to re-enter the splice case to make repairs on the splices. The rubber itself must be cut through in order to get to the splices. Furthermore, once the rubber has been cut through, the fill material is often rendered useless, thus it must be re-filled or a new splice case must be used.

Furthermore, some moisture problems have occurred in this type of filled splice case in that the rubber material will not bond to grease coated polyethylene telephone conductor; thus, when the rubber sets up, it often leaves a gap between the individual telephone conductor and the rubber itself which leaves a channel for moisture to move through to attack the splice, and thus degrade the conductor.

Examples of filled splice cases are shown in U.S. Pat. Nos. 2,312,652 and 4,070,543.

Various electrical apparatus such as transformers have been housed on containers which are substantially filled with light oil. In the case of the transformer, the oil is used to keep the coils cool as well as provide insulation to prevent shorts. Normally, transformers are located on poles above ground. Electrical power lines normally enter the transformer box from the top and make connections to the windings of the transformer, which are immersed in oil. The oils which are used in the transformer box have a specific gravity of less than 1, as do almost all oils.

High voltage capacitors have used oils as a dielectric material. An example of an oil used in disclosed Dow Chemical Product Bulletin titled Dow Dielectric Fluid C-4, form No. 17.6-1347-78. The C-4 fluid is butylated monochlorodiphenyl oxide and has a specific gravity of 1.095.

OBJECTS OF THE INVENTION

It is one object of this invention to provide a case for housing electrical components with improved moisture sealing features.

It is another object to provide an improved cable splice case.

It is still another object to provide improved cable splice case which substantially prevents moisture from coming in contact with the splices.

It is another object to provide an easily re-enterable splice case.

SUMMARY OF THE INVENTION

In accordance with one form of this invention, there is provided an electrical cable splice case, including a container housing electrical wire splices. Cable entry holes are located above the splices and receive electrical cables. A fluid sealant is received in the container, and covers the splices. The fluid sealant has a specific gravity greater than 1. If water should enter the container, the water will remain on top of the fluid sealant, placing hydraulic pressure on the fluid, thereby increasing the intimacy of the seal between the fluid and the splices. Normally, the fluid will be an oil, which is substantially insoluble with water.

In accordance with another form of the invention, the splices set forth above are replaced with other electrical components, but are protected from moisture by immersing them in a fluid with a specific gravity greater than one, similar to splice protection.

BRIEF DESCRIPTION OF THE DRAWINGS

The subject matter which is regarded as the invention is set forth in the appended claims. The invention itself, however, together with further objects and advantages thereof, can be better understood by reference to the following description, taken in conjunction with the accompanying drawing in which:

the FIGURE is a cross-sectional elevational view of a cable splice enclosure showing one form of the present invention.

DESCRIPTION OF THE PREFERRED EMBODIMENT

Referring now more particularly to the FIGURE, there is provided a cable splice system 10 which includes splice case 12 having a bottom or pan portion 14 which includes four sides and a bottom. The splice case further includes top portion 16 which acts as a cover for the splice case. The cover is secured to the bottom portion of the splice case by means of screws 18 and 20. Also, slip-on spring fasteners may be used over the cover and the bottom. A rubber seal 22 is located between the cover and the bottom cover of the case to inhibit moisture from entering the case. A pair of cables 24 and 26 enter the splice case through holes 28 and 30 in the cover. Raised portions 32 and 34 also receive the respective cables 24 and 26 and act as a seal to inhibit moisture from entering the splice box through the cable entry holes. The entry ports may also be positioned through the sides of the case at a downward angle so that the cable need not be bent so much.

As can be seen, the corresponding individual insulated conductors 36 and 38 of the respective cables are spliced together as indicated by splices 40 by a method known to those skilled in the art. The insulation from the individual conductors are first stripped from the ends to permit a splice, thus exposing the ends of the conductors to the elements outside of their insulation. Also, insulation piercing connector may be used. One major problem, as stated previously, particularly in using underground splices, has been that moisture could attack and degrade the exposed metallic conductors where they are spliced. In order to overcome this problem, there is included an amount of a fluid of 42 in the splice case, which completely covers the individual splices. In one embodiment of this invention, the fluid is an oil and the preferred oils are silicone fluids, such as Dow Corning 230 fluid, being methyl alkyl polysiloxane, commerically available from Dow Corning Company, and another is General Electric SG 1080 methyl alkyl polysiloxane silicone fluid, available from the General Electric Company. The fluid 42 should be a good electrical insulator with good dielectric strength. It is preferable that the fluid be substantially insoluble with water, and, most importantly, it must have a specific gravity greater than 1, that is, a specific gravity greater than water. The Dow Corning 230 fluid has a specific gravity of from 1.006 to 1.012 at 25° C. Other electrical fluids which have a specific gravity greater than one, and have proper insulation characteristics will also provide the desired results. The oil should not chemically attack the cable or the splices.

Since material 42 is in the fluid state, in order for it to be an effective sealant for splices 40, the fluid covered splices 40 should be lower than the cover portion 16. Thus the fluid 42 will not readily run out the entry ports 28 and 30. The need for fluid to have a specific gravity greater than 1 will become more apparent below.

In the event that water were to enter the splice case, say, for example, through seal 22 or through the entry ports 28 or 30, it would accumulate on top of the sealant fluid in the space indicated at 46. Even if the moisture were to come in through the ends of the cable 48 and 50, since the fluid is preferably substantially insoluble in water and since it has a specific gravity greater than water, the water would tend to ascend to the top of the fluid, and again, accumulate in space 46. With the water now on top of the sealant fluid, gravitational effects would cause hydraulic pressure from the water to press down on the fluid, creating an even tighter seal about the splices 40 from the now pressurized sealant fluid. Thus, quite unexpectedly, the entry of some water into the splice case actually enhances the seal and protection of the individual splices 40, which are immersed in fluid sealant 42.

The splice box itself may be made of metal or plastic. The cables are ordinary multi-pair telephone cable. The seals are ordinary rubber seals, and the splices are made as other splices have been done by those skilled in the art.

Experimental laboratory splice cases as substantially described herein have been constructed and tested. A pyrex beaker was partially filled with Dow Corning 230 fluid and tensil bars were added. These bars were made of, respectively, polyethylene, polypropolene, and polycarbonate, which are telephone cable and splice materials. The tensil bars were heated at 100° C. for five days. The tensil strength of the bars was tested, and there was no change in tensil or elongation. In another test, a 110 volt light bulb was immersed in a top open container housing the Dow Corning 230 fluid. This open container, with the top off, was immersed in a large container of water. The water came into contact with the top of the oil. The bulb was connected to an A.C. source. The bulb was left on for 48 hours with the bulb insulated from the water with no degradation.

The application of this invention could further be applied to other electrical and electronic devices which are housed housed in boxes where moisture penetration is a problem. Examples are splices which feed an underground power feeder to distribution cable, and electronic circuit cards, which are housed in a repeater housing, whereby the electronic components and connections are maintained within the fluid having a specific gravity greater than one.

From the foregoing description of the embodiments of the invention, it will be apparent that many modifications may be made therein. It will be understood, however, that this embodiment of the invention is intended as an exemplification of the invention only, and that the invention is not limited thereto. It is to be understood, therefore, that it is intended, in the appended claims, to cover all modifications that fall within the true spirit and scope of the invention.

I claim:

1. An electrical splice case including a container housing electrical wire splices, entry holes located above the position of the splices; the entry holes for receiving electrical cable; the improvement comprising:
   a fluid sealant received in said container and covering said splices, said fluid sealant being substantially a silicone oil having a specific gravity greater than 1, whereby if water should enter said container, the water will remain on top of said fluid sealant, placing hydraulic pressure on said fluid sealant, thereby increasing the intimacy of the seal on the splices.

2. A splice case as set forth in claim 1, wherein said fluid sealant is an electrical insulator.

3. A splice case as set forth in claim 1, wherein said fluid sealant is substantially insoluble with water.

4. A splice case as set forth in claim 1, wherein said silicone fluid is methyl alkyl polysiloxane.

5. A splice case as set forth in claim 1, wherein said container includes a bottom pan and a top cover, said top cover having holes there through for receiving the electrical cable.

6. A system for sealing electrical components from moisture comprising:
   a container, said container housing said electrical components;
   at least one entry hole for receiving an electrical cable in said housing;
   a fluid sealant received in said container and covering said electrical components, said fluid sealant being substantially a silicone oil having a specific gravity greater than 1, whereby if water should enter said container, the water will remain on top of said fluid sealant, placing hydraulic pressure on said fluid sealant, thereby increasing the intimacy of the seal on the components.

7. A system as set forth in claim 6, wherein said fluid sealant is an electrical insulator.

8. A system as set forth in claim 6, wherein said fluid is substantially insoluble with water.

9. A system as set forth in claim 8, wherein said silicone fluid is methyl alkyl polysiloxane.

10. A system as set forth in claim 6, wherein said housing includes a top cover and a bottom pan portion, said top cover having holes therein for receiving electrical cable connected to said electrical components.

* * * * *